(12) United States Patent
Kang et al.

(10) Patent No.: US 12,710,837 B2
(45) Date of Patent: Aug. 18, 2026

(54) DISPLAY APPARATUS AND VEHICLE INCLUDING DISPLAY PANEL

(71) Applicant: SAMSUNG DISPLAY CO., LTD., Yongin-si (KR)

(72) Inventors: Jeonmin Kang, Yongin-si (KR); Eungkwan Lee, Yongin-si (KR); Ilho Lee, Yongin-si (KR); Jaewoo Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/770,751

(22) Filed: Jul. 12, 2024

(65) Prior Publication Data

US 2025/0238093 A1 Jul. 24, 2025

(30) Foreign Application Priority Data

Jan. 18, 2024 (KR) ........................ 10-2024-0008298

(51) Int. Cl.
*G06F 3/041* (2006.01)
*B60K 35/10* (2024.01)
*B60K 35/22* (2024.01)

(52) U.S. Cl.
CPC ............ *G06F 3/0412* (2013.01); *B60K 35/10* (2024.01); *B60K 35/22* (2024.01)

(58) Field of Classification Search
None
See application file for complete search history.

(56) References Cited

U.S. PATENT DOCUMENTS 10,108,289 B2 10/2018 Kim
11,194,419 B2 12/2021 Chung et al.
2011/0082616 A1* 4/2011 Small ..................... B60K 35/00 715/744
2013/0265276 A1* 10/2013 Obeidat ............ G06F 3/041662 345/174
2016/0098141 A1* 4/2016 Kang .................... G06F 1/3265 345/174
2016/0357320 A1* 12/2016 Ito ........................... G06F 3/038
2018/0251032 A1* 9/2018 Kang ................... H01H 13/023
2020/0150805 A1* 5/2020 Kim ........................ G06F 3/044
2020/0401308 A1* 12/2020 Wu ................... G06F 3/041662

FOREIGN PATENT DOCUMENTS

KR 10-2020-0073003 A 6/2020
KR 10-2225748 B1 3/2021
KR 10-2377968 B1 3/2022
KR 10-2431241 B1 8/2022

* cited by examiner

*Primary Examiner* — Christopher R Lamb
(74) *Attorney, Agent, or Firm* — F. CHAU & ASSOCIATES, LLC

(57) ABSTRACT

A vehicle includes a display panel having a user input sensor, and a control unit configured to sense a state of the vehicle and control the display panel based on the state of the vehicle. The user input sensor is controlled by the control unit to be driven in a first mode based on a first drive voltage or a second mode based on a second drive voltage. The second drive voltage may be lower than the first drive voltage.

20 Claims, 9 Drawing Sheets

DISPLAY APPARATUS AND VEHICLE INCLUDING DISPLAY PANEL

CROSS-REFERENCE TO RELATED APPLICATION

This application is based on and claims priority under 35 U.S.C. § 119 to Korean Patent Application No. 10-2024-0008298, filed on Jan. 18, 2024, in the Korean Intellectual Property Office, the disclosure of which is incorporated by reference herein in its entirety.

BACKGROUND

1. Field

One or more embodiments relate to a display apparatus and a vehicle including a display panel.

2. Description of the Related Art

A display panel included in a display apparatus receives image data and displays an image and/or video based on the data. A variety of display panels have been developed. Examples include liquid crystal displays (LCD) panels and organic light-emitting diode (OLED) panels. In OLED panels, the display panel may include pixels, each having an OLED as a light-emitting device. More specifically, each pixel may have at least one thin-film transistor and an OLED formed on a substrate and operates as the OLED itself emits light. Such a display panel may be mounted in a vehicle. As the electric vehicle market and the autonomous vehicle market grow larger, a display panel including a touch function has been mounted in vehicles to provide more information to drivers.

SUMMARY

One or more embodiments include a display apparatus for efficient power consumption and a vehicle including the display apparatus. However, such a technical problem is an example, and one or more embodiments are not limited thereto.

Additional aspects will be set forth in part in the description which follows and, in part, will be apparent from the description, or may be learned by practice of the presented embodiments of the disclosure.

According to one or more embodiments, a vehicle including a display device includes a display panel including a user input sensor, and a control unit (or controller) configured to sense a state of the vehicle and control the display panel based on the state of the vehicle, wherein the user input sensor is controlled by the control unit to be driven in a first mode based on a first drive voltage or a second mode based on a second drive voltage, wherein the second drive voltage is lower than the first drive voltage.

According to one or more embodiments, the user input sensor in the first mode may generate a first sensing signal for sensing a change in self-capacitance included in the user input sensor and may generate a second sensing signal for sensing a change in mutual capacitance included in the user input sensor.

According to one or more embodiments, the user input sensor in the second mode may generate a first sensing signal to sense a change in self-capacitance included in the user input sensor and may not generate a second sensing signal to sense a change in mutual capacitance included in the user input sensor.

According to one or more embodiments, when the ignition of the vehicle is turned on, the user input sensor may be driven in the first mode.

According to one or more embodiments, when the state of the vehicle is switched to an Idle Stop & Go (ISG) entry state after the ignition of the vehicle is turned on, the user input sensor may be driven in the second mode.

According to one or more embodiments, when the state of the vehicle deviates from the ISG entry state, or a user input is sensed by the user input sensor, the user input sensor may be driven in the first mode.

According to one or more embodiments, when the state of the vehicle satisfies a previously determined condition after the vehicle ignition is turned on, the user input sensor may be driven in the second mode.

According to one or more embodiments, when the vehicle runs at a previously set speed or higher after the vehicle ignition is turned on, the user input sensor may be driven in the second mode.

According to one or more embodiments, when a door (e.g., a driver's door) of the vehicle is opened after the vehicle ignition is turned on, the user input sensor may be driven in the second mode.

According to one or more embodiments, when a user input is not sensed by the user input sensor for a previously set time after the vehicle ignition is turned on, the user input sensor may be driven in the second mode.

According to one or more embodiments, in the first mode, the user input sensor may sense whether there is a user's touch input or not and the user's touch position.

According to one or more embodiments, in the second mode, the user input sensor may sense whether there is a user's touch input or not and may not sense the user's touch position.

According to one or more embodiments, power consumption per unit time of the user input sensor in the first mode may be greater than power consumption per unit time of the user input sensor in the second mode.

According to one or more embodiments, a display apparatus including a display panel controlled by a control unit of a vehicle includes a substrate including a display area and a peripheral area, a plurality of touch sensors arranged in the display area of the substrate, and a driving driver arranged in the peripheral area of the substrate and configured to drive the touch sensors, wherein the driving driver is controlled by the control unit to be driven in a first mode based on a first drive voltage or a second mode based on a second drive voltage, wherein the second drive voltage is lower than the first drive voltage.

According to one or more embodiments, in the first mode, the driving driver may generate a first sensing signal to sense a change in self-capacitance included in the plurality of touch sensors and may generate a second sensing signal to sense a change in mutual capacitance included in the plurality of touch sensors.

According to one or more embodiments, in the second mode, the driving driver may generate a first sensing signal to sense a change in self-capacitance included in the plurality of touch sensors and may not generate a second sensing signal to sense a change in mutual capacitance included in the plurality of touch sensors.

According to one or more embodiments, when the vehicle ignition is turned on, the driving driver may be driven in the first mode.

According to one or more embodiments, when a state of the vehicle is switched to one of a plurality of previously set conditions after the vehicle ignition is turned on, the driving driver may be driven in the second mode, wherein the plurality of previously set conditions may include a case where the vehicle runs at a previously set speed or higher, a case where a door (e.g., a driver's door) of the vehicle is opened, a case where a user input is not sensed by the touch sensors for a previously set time, and a case where the vehicle enters an Idle Stop & Go (ISG) mode.

According to one or more embodiments, when the state of the vehicle deviates from one of the plurality of previously set conditions, or a user input is sensed by the touch sensors, the driving driver may be driven in the first mode.

According to one or more embodiments, when the driving driver is in the first mode, the touch sensors may sense whether there is a user's touch input or not and the user's touch position, and when the driving driver is in the second mode, the touch sensors may sense whether there is a user's touch input or not and may not sense the user's touch position.

In accordance with one or more embodiments, a method for controlling a display apparatus includes driving a touch sensor in a first mode, determining whether at least one previously set condition is satisfied, and driving the touch sensor in a second mode when the at least one previously set condition is satisfied. In the first mode, the touch sensor generates a first sensing signal to sense a change in self-capacitance and a second sensing signal to sense a change in mutual capacitance. In the second mode, the touch sensor generates the first sensing signal but not the second sensing signal. As a result, power consumption in the first mode is greater than power consumption in the second mode.

The first sensing signal may be generated based on a touch by a user, and the second sensing signal may be generated based on a position of the touch. The touch sensor may be driven by a first drive voltage in the first mode, the touch sensor may be driven by a second drive voltage in the second mode which is less than the first drive voltage. A number of bursts in the second mode may be less than a number of bursts in the first mode. The at least one previously set condition is one of a case where the vehicle runs at a previously set speed or higher, a case where the door of the vehicle is opened, a case where a user input is not sensed by touch sensor for a previously set time, or a case where the vehicle enters an idle step and go (ISG) mode.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
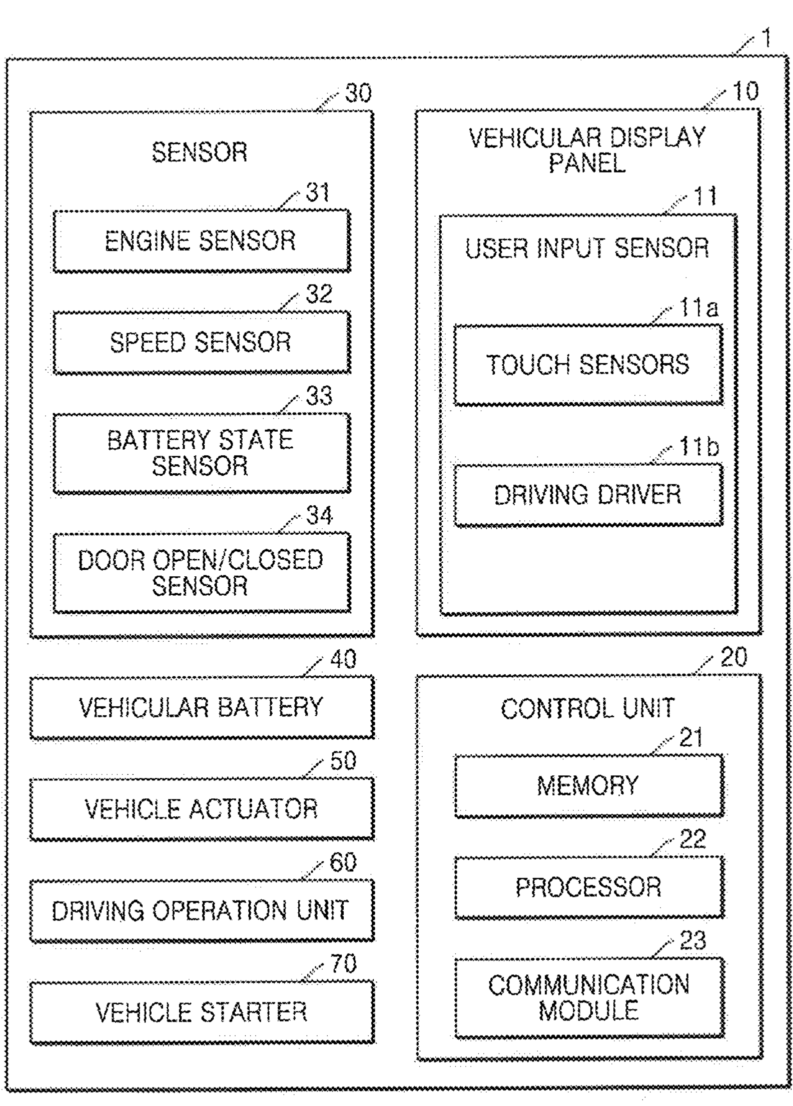
FIG. 1 is a schematic conceptual diagram of a vehicle including a display panel, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

It will be understood that, when an element, such as a layer, a film, a region, or a plate, is referred to as being "on" another element, it may be "directly on" the other element, or intervening elements may be present therebetween. It will be further understood that, when an element, such as a layer, a film, a region, or a plate, is referred to as being "under" another element, it may be "directly under" the other element, or intervening elements may be present therebetween.

In addition, sizes of elements in the drawings may be exaggerated or reduced for convenience of explanation. For example, since sizes and thicknesses of elements in the drawings are arbitrarily illustrated for convenience of description, the following embodiments are not limited thereto. That is, for convenience of description, sizes, thicknesses, and ratios of elements illustrated in the drawings may be exaggerated and/or simplified for clarity. Accordingly, spatially relative terms, such as "beneath," "below," "lower," "under," "above," and "upper," may be used herein to easily describe the relationship of one element or feature to another element(s) or feature(s).

The terms used herein to describe spaces, orientations, etc., are terms for describing spaces and orientations illustrated in the drawings but may be understood as terms for describing various other orientations or perspectives. For example, in a case where an apparatus or element illustrated in the figures is turned over, the apparatus or element described as "below" may be construed as being otherwise orientated (e.g., rotated 90 degrees or in the opposite direction). For example, in a case where an apparatus or element illustrated in the figures is turned over, the apparatus or element described as "above" may be construed as being otherwise orientated (e.g., rotated 90 degrees or in the opposite direction). Thus, the terms "below" and "above" may encompass both orientations of above and below. In addition, an apparatus or element may be oriented differently from the drawings, and descriptions of spaces or orientations set forth herein may be interpreted in various ways.

The terms "first," "second," "third," etc., may be used herein to describe certain elements herein, and such terms as "first," "second," and "third" may be used to distinguish one element from another element.

It will be understood that, when an element is referred to as being "connected to" or "coupled to" another element, it may be connected to or coupled to the other element directly or indirectly. In the same manner, when an element is referred to as being "electrically connected to" another element, they may be directly and electrically connected to each other or may be indirectly and electrically connected to each other through a conductive element.

It will also be understood that, when an element is referred to as being "between" two elements, it may be the only element between the two elements or another element in addition to the element may be between the two elements.

The terminology used herein is for the purpose of describing particular embodiments and is not intended to be limiting of the disclosure. As used herein, the singular forms "a" and "an" are intended to include the plural forms as well, unless the context clearly indicates otherwise.

For example, the terms "include," "comprise," "have," etc., specify the presence of stated features, integers, steps, operations, elements and/or components but do not preclude the presence or addition of one or more other features, integers, steps, operations, elements, components and/or groups thereof.

For example, in the present description. when a layer is referred to as having the "same layer structure" as another layer, a plurality of layers included in the layer may be included in the other layer in the same order. For example, a plurality of layers included in the layer and a plurality of layers included in the other layer may respectively include the same material and may be formed in the same order.

Electronic or electric devices and/or any other relevant devices or components (e.g., some of various modules) according to embodiments of the disclosure described herein may be implemented using any suitable hardware, firmware (e.g., an application-specific integrated circuit), software, or a combination of software, firmware, and hardware. For example, various components of these devices may be formed on one integrated circuit (IC) chip or on separate IC chips. Furthermore, various components of these devices may be formed on a flexible printed circuit film, a tape carrier package (TCP), a printed circuit board (PCB), or one substrate. Furthermore, various components of these devices may be a process or thread, running on one or more processors, in one or more computing devices, executing computer program instructions and interacting with other system components for performing various functionalities described herein.

The computer program instructions are stored in a memory which may be implemented in a computing device by using a standard memory device such as, for example, random access memory (RAM). The computer program instructions may also be stored in other non-transitory computer readable media such as, for example, a CD-ROM, flash drive, etc. In addition, those of ordinary skill in the art should recognize that the functionality of various computing devices may be combined or integrated into a single computing device, or the functionality of a particular computing device may be distributed over one or more other computing devices without departing from the spirit and scope of example embodiments of the disclosure.

Hereinafter, a display apparatus and a vehicle including a display device, according to an embodiment, will be described in more detail based on the above descriptions.

Figure 2:
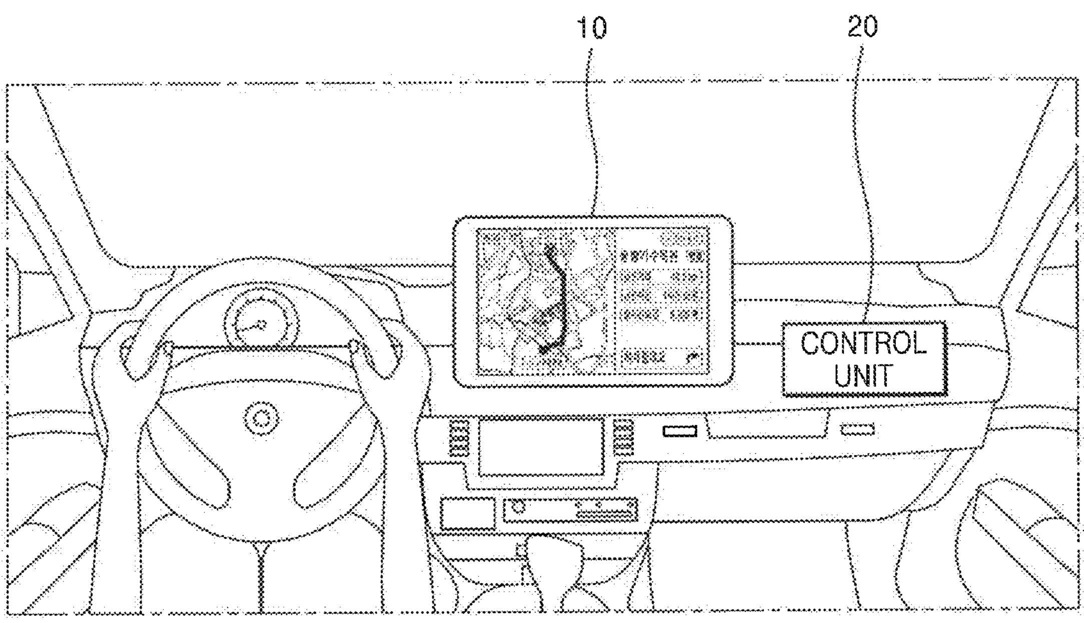
FIG. 2 is a diagram schematically showing an example of the interior of the vehicle of FIG. 1.

FIG. 1 is a schematic conceptual diagram of a vehicle 1 including a display panel, according to an embodiment. FIG. 2 is a diagram schematically showing an example of the interior of the vehicle 1 of FIG. 1.

As shown in FIGS. 1 and 2, the vehicle 1 including a display device (hereinafter, the vehicle 1) may include a display panel 10 and a control unit (or controller) 20.

The display panel 10 may be any of various panels such as a liquid crystal display (LCD) panel or an organic light-emitting diode (OLED) panel. The display panel 10 may include a display area DA (e.g., see FIG. 6) displaying a screen and a peripheral area PA arranged around the display area DA. The display panel 10 may include a user input sensor 11 (e.g., a touch sensor device, a touch panel, etc.).

For example, the user input sensor 11 is capable of recognizing a touch input in which a user touches a display screen. The user input sensor 11 may be included in the display panel 10 as a touch panel (an on-cell type) or may be included therein as an in-cell type.

The user input sensor 11 may include a plurality of touch sensors **11*a* and a driving driver 11*b*. The plurality of touch sensors 11*a* may include a plurality of touch electrodes. The plurality of touch electrodes may include a first touch conductive layer MTL1 and a second touch conductive layer MTL2 of a touch sensing layer YTL, which are described, for example, with reference to FIG. 8**.

The driving driver **11*b* may generate a driving signal of a predetermined standard and transmit the generated driving signal to the plurality of touch sensors 11*a* or the plurality of touch electrodes. For example, the driving signal may be a signal shown, for example, in FIG. 3 described below. The driving driver 11*b* may be arranged in the peripheral area PA of a substrate 100 described below with reference to FIG. 6, and the plurality of touch sensors 11*a* or the plurality of touch electrodes may be arranged in the display area DA of the substrate 100 (e.g., see FIG. 8) described below. In addition, as described below with reference to FIG. 8, it is assumed that the display panel described herein is an OLED panel and the user input sensor 11** is of an on-cell type, but one or more embodiments are not limited thereto.

The control unit (or controller) 20 may be an electronic control unit for controlling elements of the vehicle 1. The control unit 20 may sense a vehicle state through a sensor 30 described below, and may control elements (particularly, the display panel 10) included in the vehicle 1, based on the vehicle state. For example, the user input sensor 11 may include the driving driver **11*b* configured to generate a driving signal for touch input recognition. The control unit 20 may change the driving signal for touch input recognition according to one or more predetermined settings by controlling the driving driver 11*b***.

In addition, the control unit 20 may sense a vehicle state through the sensor 30 described below, and may change the vehicle state to an Idle Stop & Go (ISG) entry state when the vehicle 1 satisfies ISG entry conditions. The ISG function described herein may refer to a function of turning off the engine of the vehicle 1 when the vehicle 1 comes to a stop after satisfying certain conditions while running and restarting the engine when the vehicle 1 starts.

As described above, when the control unit 20 is an electronic control unit for controlling elements of the vehicle 1, the control unit 20 may control the driving driver **11*b* or the user input sensor 11** described above and may further reduce power consumption in the ISG mode accordingly.

For example, the control unit 20 may include a memory 21, a processor 22, and a communication module 23.

The processor 22 may be configured to execute instructions stored in the memory 21 to control other elements. The processor 22 may be configured to execute instructions stored in the memory 21. The processor 22 is an element capable of performing operations and controlling another device. The processor 22 may mainly be, or include, a central processing unit (CPU), an application processor (AP), a graphics processing unit (GPU), etc. In addition, the CPU, AP, or GPU may be included in a vehicle electronic control unit (ECU). The CPU, AP, or GPU may include one or more cores inside and may operate using a working voltage and a clock signal.

The memory 21 stores, in addition to instructions, data for supporting various functions of the control unit 20. The memory 21 may store a one or more application programs or applications running on the control unit 20, as well as data and instructions for operation of the control unit 20. The memory 21 may include at least one type of storage medium from among a flash memory type, a hard disk type, a solid state disk (SSD) type, a silicon disk drive (SDD) type, a multimedia card micro type, a card type memory (e.g., secure digital (SD) memory, extreme digital (XD) memory, etc.), RAM, static random-access memory (SRAM), read-only memory (ROM), electrically erasable programmable read-only memory (EEPROM), programmable read-only memory (PROM), magnetic memory, a magnetic disk, and/or an optical disk.

The communication module 23 may serve as an interface capable of transceiving data with other elements of the vehicle 1. The communication module 23 may use safe standards due to vibration and external shocks that occur while the vehicle 1 is running. In some cases, the communication module 23 may perform wired communication or wireless communication.

The vehicle 1 according to an embodiment may further include the sensor 30. The sensor 30 may obtain certain data through sensors arranged inside the vehicle 1. For example, the sensor 30 may include an engine sensor 31, a speed sensor 32, a battery state sensor 33, and a door open/closed sensor 34.

The engine sensor 31 may sense whether the engine is turned on or off, the temperature of the engine, the revolutions per minute (RPM) of the engine, etc. The speed sensor 32 may sense the speed and/or acceleration of the vehicle 1. The battery state sensor 33 may sense the state of charge of the battery, a battery temperature, a battery cycle, a battery voltage, etc. The door open/closed sensor 34 may sense an open/closed state of each door of the vehicle 1. In addition, the vehicle 1 may include a gear status sensor, a vehicle interior temperature sensor, a steering wheel position sensor, and a brake pressure sensor.

The vehicle 1 according to an embodiment may further include a vehicular battery 40, a vehicle actuator 50, a driving operation unit 60, and a vehicle starter 70. The vehicular battery 40 may supply power to drive all electrically driven electronic devices in the vehicle 1. For example, the vehicular battery 40 may supply power for driving the sensor 30, the display panel 10, etc. For example, in the case of an electric-powered vehicle, the vehicular battery 40 may supply power for driving an electric motor of the vehicle 1.

The vehicle actuator 50 may include the engine of the vehicle 1, and in some embodiments may refer to an element generating power for the vehicle 1 to run. The driving operation unit 60 may include, for example, a steering wheel, a gear part, a brake device, etc., to be used by a user to drive the vehicle 1. The vehicle starter 70 is a device for turning on/off the vehicle actuator 50, and may refer to, for example, a starter motor in the case of an internal combustion engine.

The vehicle 1 according to an embodiment may have an ISG (idle stop & go) system. The ISG system may be implemented by control of the control unit 20 described above. For example, when ISG mode entry conditions are met, the control unit 20 may stop the engine of the vehicle 1 or may turn off the engine. For example, when conditions for releasing ISG mode entry are met, the control unit 20 may restart the engine of the vehicle 1 or may turn on the engine. In this regard, predetermined conditions may be used as the ISG mode entry conditions and the ISG mode entry release conditions. Particular examples of one or more embodiments are described below as follows.

The user input sensor 11 may be controlled by the control unit 20 to be driven in a first mode of being driven with a first drive voltage or a second mode of being driven with a second drive voltage. The second drive voltage may be lower than the first drive voltage. For example, the first mode may be an active mode in which functions of the user input sensor 11 are activated. For example, the second mode may be an idle mode in which only certain predetermined functions of the user input sensor 11 are activated. Due to various factors (e.g., the difference in drive voltage), power consumption of the user input sensor 11 in the first mode may be greater than power consumption of the user input sensor 11 in the second mode. Accordingly, as the second mode is appropriately used, the user input sensor 11 or the display panel 10 in the second mode may have significantly reduced power consumption. Along with reduced power consumption, production of electromagnetic waves is also reduced.

When operating in the first mode, the user input sensor 11 may generate a first sensing signal for sensing a change in self-capacitance included in the user input sensor 11. For example, the first sensing signal may be a self-sensing signal which serves as a driving signal for touch recognition in special cases such as when there is moisture on a display panel. For example, the first sensing signal may be a driving signal that is mainly used to sense only the presence of a user's touch input.

The user input sensor 11 in the first mode may further generate a second sensing signal for sensing a change in mutual capacitance included in the user input sensor 11. For example, the second sensing signal may be a mutual sensing signal which serves as a driving signal for general touch recognition. For example, the second sensing signal may be a driving signal that is mainly used to sense position information regarding a user's touch input. For example, in the first mode, the user input sensor 11 may sense whether there is a user's touch input or not by using the first sensing signal and may sense the user's touch position by using the second sensing signal.

When operating in the second mode, the user input sensor 11 may generate a first sensing signal for sensing a change in self-capacitance included in the user input sensor 11. In this regard, the user input sensor 11 in the second mode may not generate a second sensing signal for sensing a change in mutual capacitance included in the user input sensor 11. The second mode may be an idle mode of waiting only for the first sensing signal. As a result, power for generating a second sensing signal may be saved. For example, in the second mode, the user input sensor 11 may sense whether there is a user's touch input or not by using the first sensing signal. In the second mode, the user input sensor 11 may not use a second sensing signal and thus may not sense a user's touch position. Accordingly, power consumption per unit time of the user input sensor 11 in the first mode may be greater than power consumption per unit time of the user input sensor 11 in the second mode. By appropriately increasing the time for being driven in the second mode, power efficiency of the display panel 10 may be increased.

Figure 3:
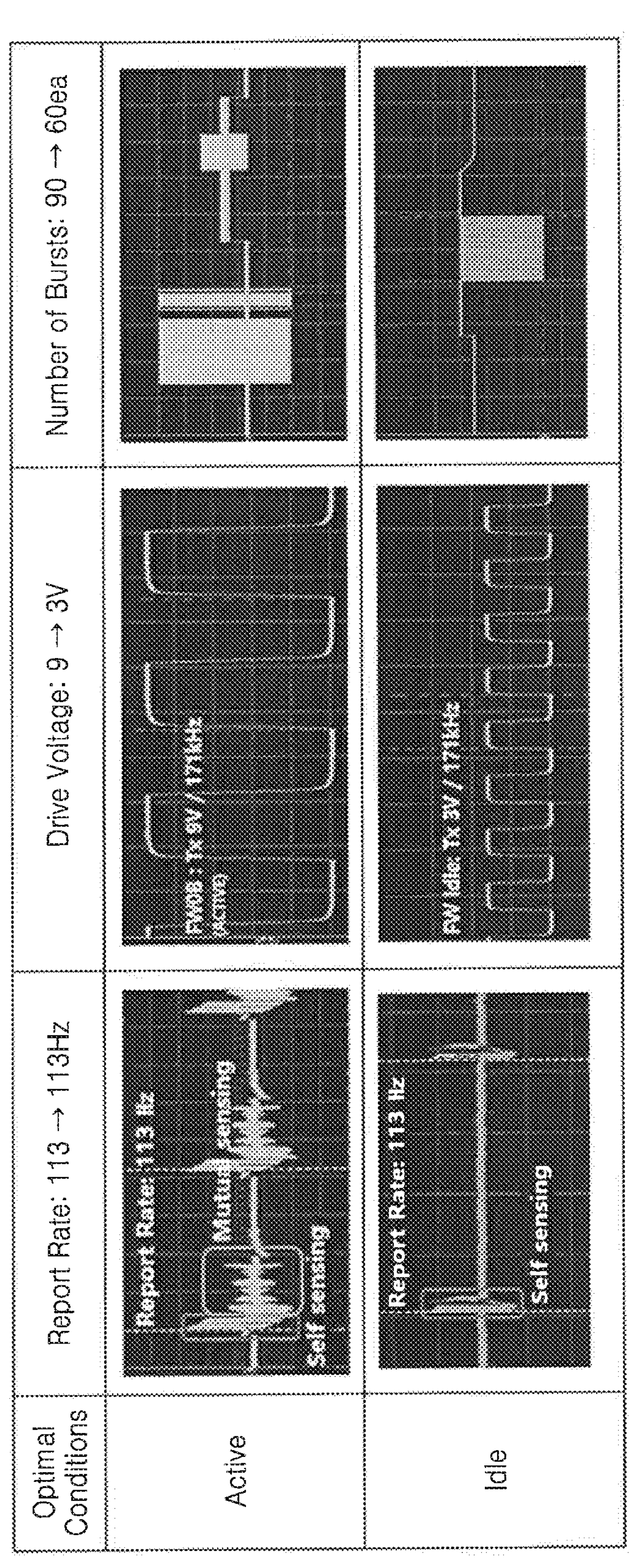
FIG. 3 is a table schematically showing an example of drive signals of a user input sensor of FIG. 1.

FIG. 3 is a table schematically showing an example of drive signals of the user input sensor 11 of FIG. 1. For reference, a description of FIG. 3 that is the same as or overlaps the above description may be omitted.

As shown in FIG. 3, in a first mode (Active mode), the report rate may be 113 Hz, the drive voltage applied to the touch electrode may be 9 V, and the number of bursts may be 90 ea. In a second mode (Idle mode), the report rate may be 113 Hz, the drive voltage applied to the touch electrode may be 3 V, and the number of bursts may be 60 ea. As described above, as the magnitude of the drive voltage decreases, and the number of bursts decreases, power consumed by the user input sensor 11 in the second mode may be significantly reduced compared to power consumed by the user input sensor 11 in the first mode.

An example of changes in power, etc., according to changes in the report rate, the drive voltage, and the number of bursts are summarized in Table 1.

ignition of the vehicle 1 (operation S1100), may drive the display panel 10 (user input sensor 11) in a first mode (operation S1200), may sense whether the vehicle 1 satisfies a previously set condition or not (operation S1300), and may drive the display panel 10 in a second mode when the vehicle 1 satisfies the previously set condition (operation S1400). In this regard, driving the display panel 10 in the first mode or the second mode may be understood as driving or operating the user input sensor 11 in the first mode or the second mode. Accordingly, as the second mode is appropriately used, the user input sensor 11 or the display panel 10 in the second mode may have significantly reduced power consumption. Along with reduced power consumption, production of electromagnetic waves is also reduced.

When the vehicle 1 does not satisfy the previously set condition, the vehicle 1 or the control unit 20 of the vehicle 1 according to an embodiment may continue to drive the display panel 10 in the first mode (operation S1200). Afterwards, the vehicle 1 or the control unit 20 of the vehicle 1 may sense again whether the vehicle 1 satisfies the previously set condition or not (operation S1300).

TABLE 1

| Mode | Report Rate | Drive Voltage | Burst | Total Energy | EMI Level | EMI [dBuV/m] | 1st Latency [ms] | Current Consumed (mA) |
|---|---|---|---|---|---|---|---|---|
| First Mode | 113 Hz | 9 V | 30 ea | 30,510 | 13.96 | 22.9 | 30.5 | 45 |
| Second Mode | 1.5 Hz | 3 V | 30 ea | 135 | 0.06 | 0.1 | 1,355.0 | 2 |
| | 30 Hz | 3 V | 30 ea | 2,700 | 1.24 | 2.0 | 88.4 | 2.9 |
| | 50 Hz | 3 V | 30 ea | 4,500 | 2.06 | 3.4 | 61.7 | 3.3 |
| | 113 Hz | 3 V | 30 ea | 10,170 | 4.65 | 7.6 | 39.4 | 5.2 |
| | 226 Hz | 3 V | 15 ea | 10,170 | 4.65 | 7.6 | 30.5 | 5.2 |

In Table 1, the report rate is the frequency indicating how often a touch panel reports touch information to a computer or a controller (e.g. control unit 20), and this may usually be measured in 'hertz' (Hz), which indicates how many times touch information can be sent per second.

The drive voltage is the voltage used to activate a sensor of the touch panel and may provide energy used by the touch sensor to sense a touch.

The number of bursts is the number of bundles of electrical signals sent by the sensor of the touch panel to sense a touch, and more bursts generally mean higher precision of sensing but may also cause an increase in energy consumption and the amount of data to be processed.

As shown in [Table 1], in one embodiment, optimal conditions of the user input sensor 11 in the second mode are as follows.

(1) Report Rate=226 Hz (2) Drive Voltage=3 V (3) Number of Bursts=15 ea

The user input sensor 11 driven in the second mode under the above optimal conditions has the following advantages compared to the user input sensor 11 driven in the first mode.

(1) EMI: 22.9→7.6 (improved by about 67%)

(2) Current Consumption: 45→5.2 (improved by about 88%)

(3) Electrical Stress: 30,510→10.170 (improved by about 67%)

Figure 4:
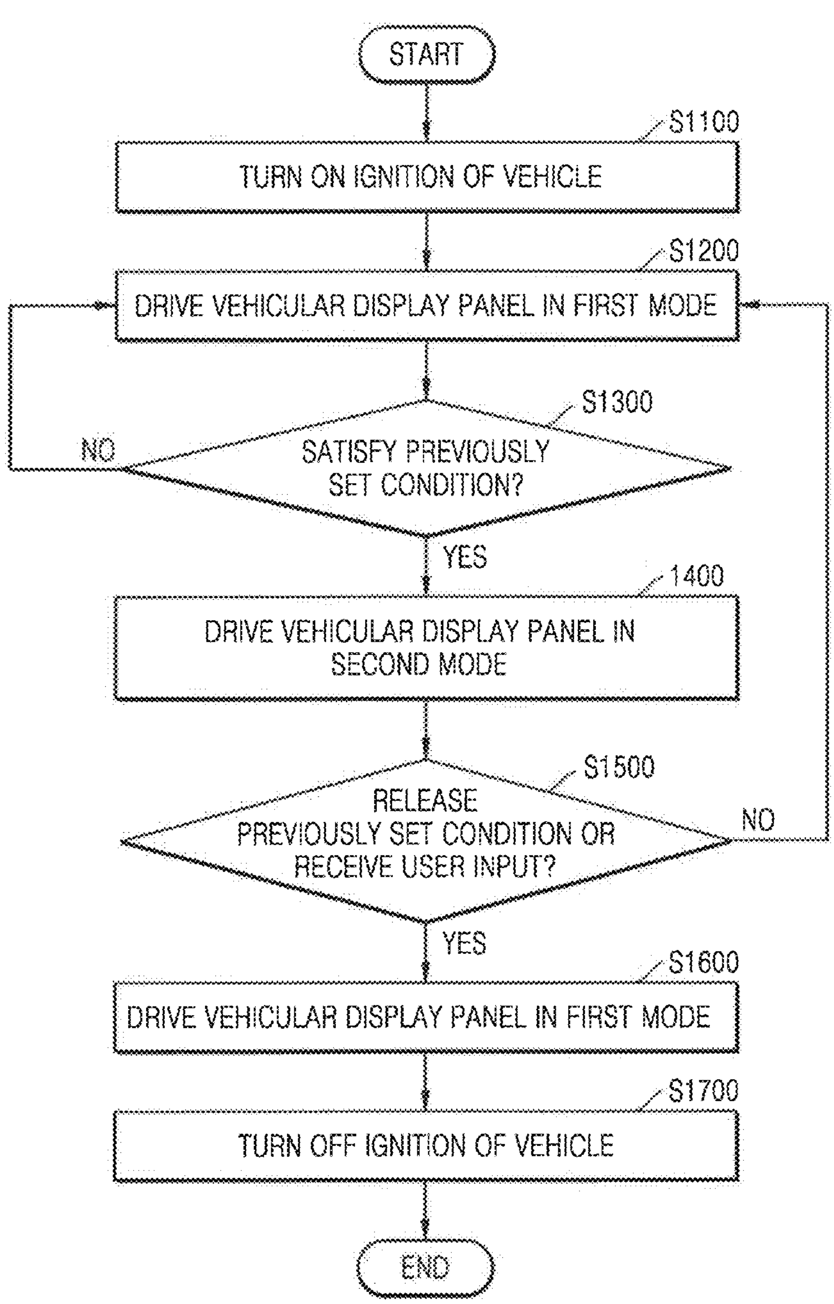
FIG. 4 is a flowchart showing an example of a method of driving the display panel of FIG. 1.

FIG. 4 is a flowchart showing an example of a method of driving the display panel 10 of FIG. 1. For reference, a description of FIG. 4 that is the same as or overlaps the above description may be omitted.

As shown in FIG. 4, the vehicle 1 or the control unit 20 of the vehicle 1 according to an embodiment may turn on the The previously set condition may be one of the following conditions.

(1) A case where the vehicle 1 runs at a previously set speed or higher (2) A case where the driver's door of the vehicle 1 is opened (3) A case where a user input is not sensed by the user input sensor 11 for a previously set time (4) A case where the vehicle 1 enters an ISG mode After driving the display panel 10 in the second mode, the vehicle 1 or the control unit 20 may sense whether the previously set condition is released or a user input is received (operation S1500). The vehicle 1 or the control unit 20 may drive the display panel 10 in the first mode after the previously set condition is released or a user input is received (operation S1600). Afterwards, when the ignition of the vehicle 1 is turned off (in operation S1700), the above series of processes comes to an end.

For example, when a state of the vehicle 1 satisfies a previously determined condition after the ignition of the vehicle 1 is turned on, the user input sensor 11 may be driven in the second mode.

For example, when the vehicle 1 runs at a previously set speed or higher after the ignition of the vehicle 1 is turned on, the user input sensor 11 may be driven in the second mode.

For example, when the driver's door of the vehicle 1 is opened after the ignition of the vehicle 1 is turned on, the user input sensor 11 may be driven in the second mode.

For example, when a user input is not sensed by the user input sensor 11 for a previously set time after the ignition of the vehicle 1 is turned on, the user input sensor 11 may be driven in the second mode.

Figure 5:
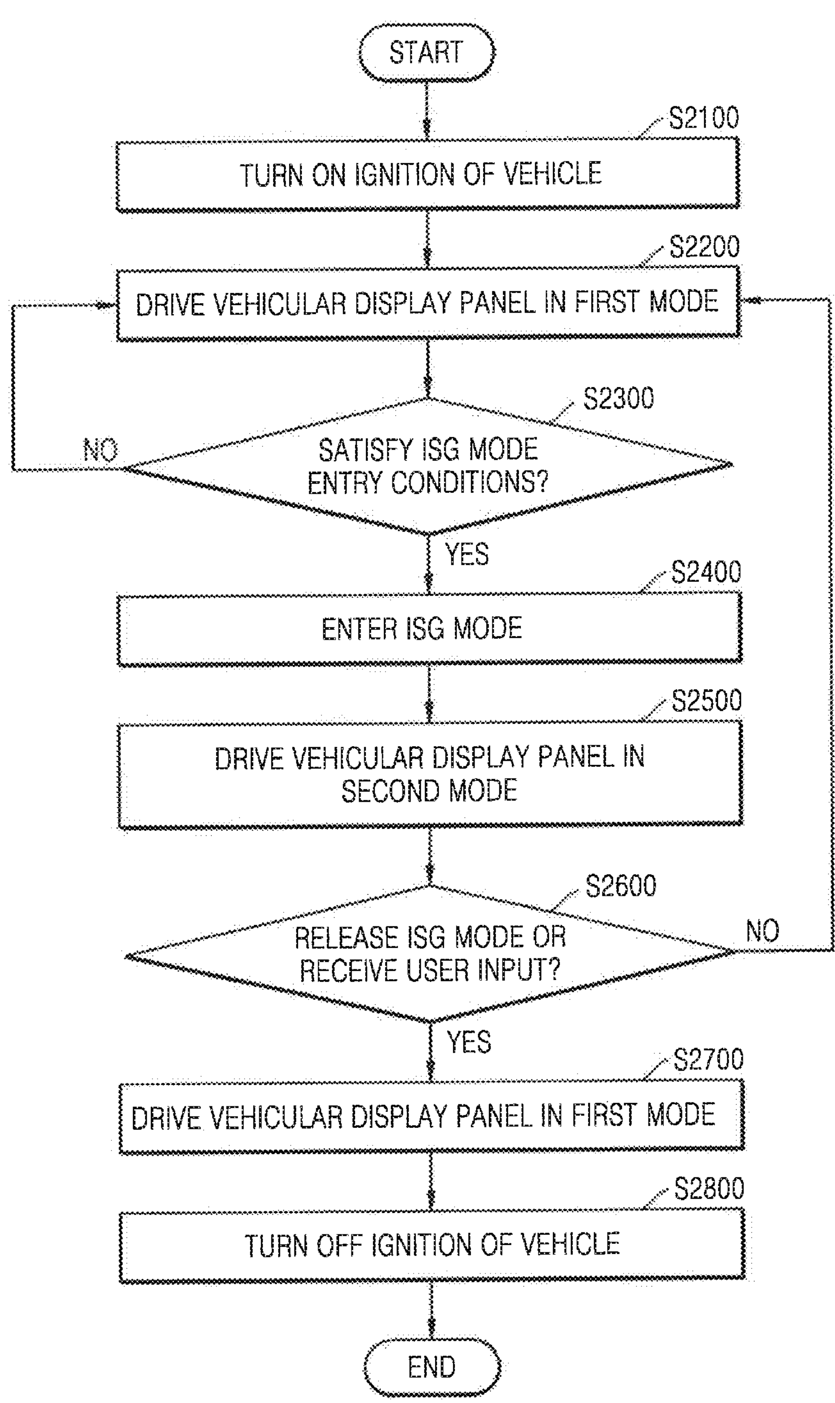
FIG. 5 is a flowchart showing an example of a method of driving the display panel of FIG. 1.

FIG. 5 is a flowchart showing an example of a method of driving the display panel 10 of FIG. 1. For reference, a description of FIG. 5 that is the same as or overlaps the above description may be omitted.

As shown in FIG. 5, the vehicle 1 or the control unit 20 of the vehicle 1 according to an embodiment may turn on the ignition of the vehicle 1 (operation S2100), may drive the display panel 10 (or the user input sensor 11) in a first mode (operation S2200), and may sense whether the vehicle 1 satisfies ISG mode entry conditions or not (operation S2300), and the vehicle 1 may enter an ISG mode when the vehicle 1 satisfies the ISG mode entry conditions (operation S2400).

When the vehicle 1 enters the ISG mode, the vehicle 1 or the control unit 20 of the vehicle 1 may drive the display panel 10 in a second mode (operation S2500). After the display panel 10 is driven in the second mode, the vehicle 1 or the control unit 20 of the vehicle 1 may sense whether the ISG mode of the vehicle 1 is released or a user input is received or entered (in operation S2600).

After the ISG mode is released, or a user input is received or entered, the vehicle 1 or the control unit 20 of the vehicle 1 may drive the display panel 10 in the first mode (operation S2700). Afterwards, when the ignition of the vehicle 1 is turned off (operation S2800), the above series of processes comes to an end. For example, when the ignition of the vehicle 1 is turned on, the user input sensor 11 may be driven in the first mode. For example, when a state of the vehicle 1 is switched to an ISG entry state after the ignition of the vehicle 1 is turned on, the user input sensor 11 may be driven in the second mode. In addition, when the state of the vehicle 1 deviates from the ISG entry state, or a user input is sensed by the user input sensor 11, the user input sensor 11 may be driven in the first mode.

In one embodiment, the ISG mode entry conditions described above may be the following conditions, and all of the following conditions may be satisfied to enter the ISG mode.

(1) A state in which the ignition of the vehicle 1 is turned on (2) A state in which the vehicle 1 has come to a stop after running at a certain speed or higher (3) A state in which the battery's state of charge has met previously determined criteria (4) A state in which pressure of a previously determined magnitude has been applied to the brake pedal The entry conditions (1) to (4) are merely given as an example. In other embodiments, different entry conditions may be used.

Figure 6:
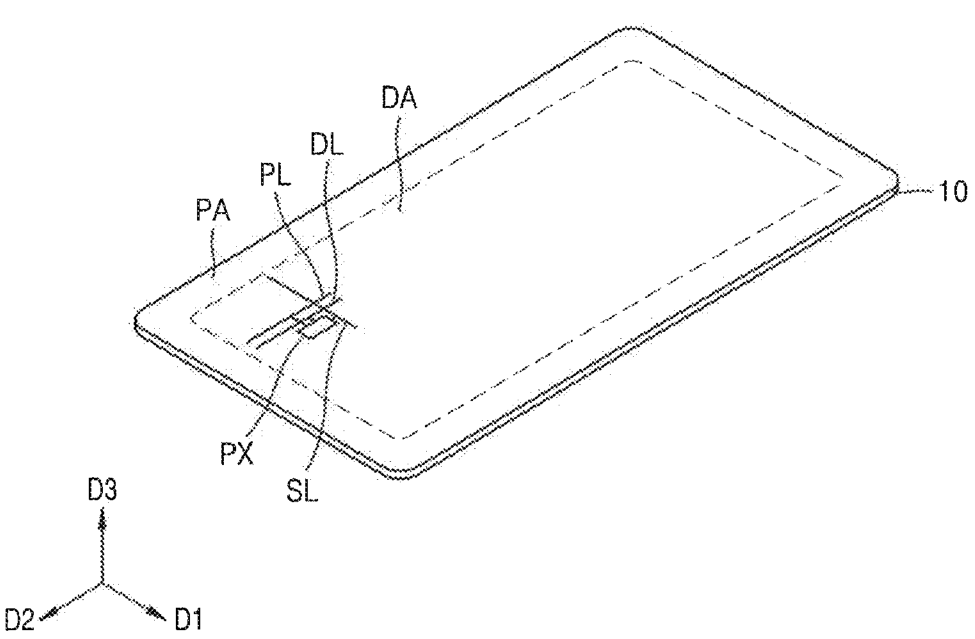
FIG. 6 is a schematic perspective view of a display panel according to an embodiment.

FIG. 6 is a schematic perspective view of the display panel 10 according to an embodiment. For reference, a description of the display panel 10 that is the same as or overlaps the above description may be omitted.

As shown in FIG. 6, because the display panel 10 according to an embodiment includes thin-film transistors and at least one capacitor, the thin-film transistors and the at least one capacitor may be implemented by conductive layers and insulating layers.

The display panel 10 includes the display area DA and the peripheral area PA outside and around the display area DA. FIG. 6 shows the display area DA having a rectangular shape, but one or more embodiments are not limited thereto. The display area DA may have various shapes, for example, a circular shape, an oval shape, a polygonal shape, or a shape of a certain figure.

The display area DA is an area that displays an image, and a plurality of pixels PX may be arranged in the display area DA. Each pixel PX may include a display element such as an organic light-emitting device. Each pixel PX may emit, for example, red, green, or blue light. Each pixel PX may be connected to a pixel circuit including one or more thin-film transistors (TFTs) and at least one storage capacitor. The pixel circuit may be connected to a scan line SL configured to transmit a scan signal, a data line DL crossing the scan line SL and configured to transmit a data signal, and a driving voltage line PL configured to supply a driving voltage. The data line DL and the driving voltage line PL may extend in a second direction D2, and the scan line SL may extend in a first direction D1.

The pixel PX may emit light having a luminance corresponding to an electrical signal output from an electrically connected pixel circuit. The display area DA may display a certain image through light emitted from the pixel PX. For reference, the pixel PX may correspond to an emission area that emits light having at least one color among red, green, and blue. In one embodiment, each pixel may include a plurality of sub-pixels, each emitting light of a different color.

The peripheral area PA is an area in which no pixels PX are arranged, and therefore may be an area that does not display an image. A power supply wire for driving the pixel PX may be arranged in the peripheral area PA. In addition, pads may be arranged in the peripheral area PA, and a PCB including a driving circuit portion or an IC device such as a driver IC may be electrically connected to the pads in the peripheral area PA. For reference, because the display panel 10 includes the substrate 100 (e.g., of FIG. 8), the substrate 100 may also have the display area DA and the peripheral area PA. A detailed description of the substrate 100 will be given later.

In addition, a plurality of transistors may be arranged in the display area DA. In the plurality of transistors, depending on the type (N-type or P-type) and/or operation conditions of a transistor, a first terminal of the transistor may be a source electrode or a drain electrode, and a second terminal of the transistor may be an electrode different from the first terminal. For example, when the first terminal is a source electrode, the second terminal may be a drain electrode.

For example, the plurality of transistors may include a driving transistor, a data writing transistor, a compensation transistor, an initialization transistor, and an emission control transistor. The driving transistor may be connected between the driving voltage line PL and an organic light-emitting device, and the data writing transistor may be connected to the data line DL and the driving transistor and may be configured to perform a switching operation for transmitting a data signal transmitted through the data line DL.

The compensation transistor may be turned on according to a scan signal received through the scan line SL, to connect the driving transistor and the organic light-emitting device to each other, thereby compensating for the threshold voltage of the driving transistor.

The initialization transistor may be turned on according to a scan signal received through the scan line SL, to transfer an initialization voltage to a gate electrode of the driving transistor, thereby initializing the gate electrode of the driving transistor. A scan line connected to the initialization transistor may be a separate scan line different from a scan line connected to the compensation transistor.

The emission control transistor may be turned on according to an emission control signal received through an emission control line. As a result, a driving current may flow through the organic light-emitting device.

The organic light-emitting device may include a pixel electrode (e.g., an anode) and an opposite electrode (e.g., a cathode) and may receive a voltage from the pixel electrode (e.g., the anode) and the opposite electrode (e.g., the cathode). The organic light-emitting device may receive a driving current from the driving transistor and emit light, thereby displaying an image.

Although an organic light-emitting display apparatus is described below as an example of a display apparatus according to an embodiment, a display apparatus described herein is not limited thereto. In another embodiment, the display apparatus described herein may be, for example, an inorganic light-emitting display (or an inorganic electroluminescent (EL) display) or a quantum dot light-emitting display. For example, an emission layer of a display element included in the display apparatus may include an organic material or an inorganic material. Alternatively, the display apparatus may include an emission layer and quantum dots positioned on a path of light emitted from the emission layer.

Figure 7:
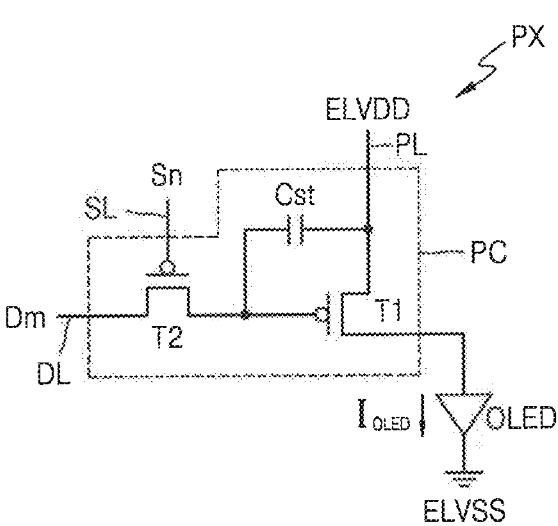
FIG. 7 is an equivalent circuit diagram schematically showing a pixel of a display apparatus of FIG. 6 according to an embodiment.

FIG. 7 is an equivalent circuit diagram schematically showing the pixel PX of a display apparatus of FIG. 6. For reference, a description of FIG. 7 that is the same as or overlaps the above description may be omitted.

As shown in FIG. 7, each pixel PX includes a pixel circuit PC connected to the scan line SL and the data line DL and an organic light-emitting device OLED connected to the pixel circuit PC. For example, the pixel circuit PC includes a driving TFT T1, a switching TFT T2, and a storage capacitor Cst. The switching TFT T2 is connected to the scan line SL and the data line DL and is configured to transmit a data signal Dm input through the data line DL to the driving TFT T1 according to a scan signal Sn input through the scan line SL.

For example, the storage capacitor Cst is connected to a node between the switching TFT T2 and the driving TFT T1 and the driving voltage line PL. The storage capacitor Cst stores a voltage corresponding to a difference between a voltage received from the switching TFT T2 and a first power voltage (or referred to as a driving voltage) ELVDD supplied to the driving voltage line PL.

For example, the driving TFT T1 may be connected to the driving voltage line PL and the storage capacitor Cst, and may be configured to control a driving current flowing through the organic light-emitting device OLED from the driving voltage line PL, in response to a voltage value stored in the storage capacitor Cst. The organic light-emitting device OLED may emit light having a certain luminance according to the driving current.

The organic light-emitting device OLED may receive a second power voltage (or referred to as a common voltage) ELVSS. For example, the organic light-emitting device OLED may receive the second power voltage (or referred to as the common voltage) ELVSS through an opposite electrode (e.g., a cathode), and the organic light-emitting device OLED may emit light having a certain luminance according to a driving current resulting from a voltage difference between the first power voltage (or referred to as the driving voltage) ELVDD and the second power voltage (or referred to as the common voltage) ELVSS.

FIG. 7 shows a case where the pixel circuit PC includes two TFTs and one storage capacitor, but one or more embodiments are not limited thereto. For example, the pixel circuit PC may include two or more storage capacitors and may also include three or more TFTs.

Figure 8:
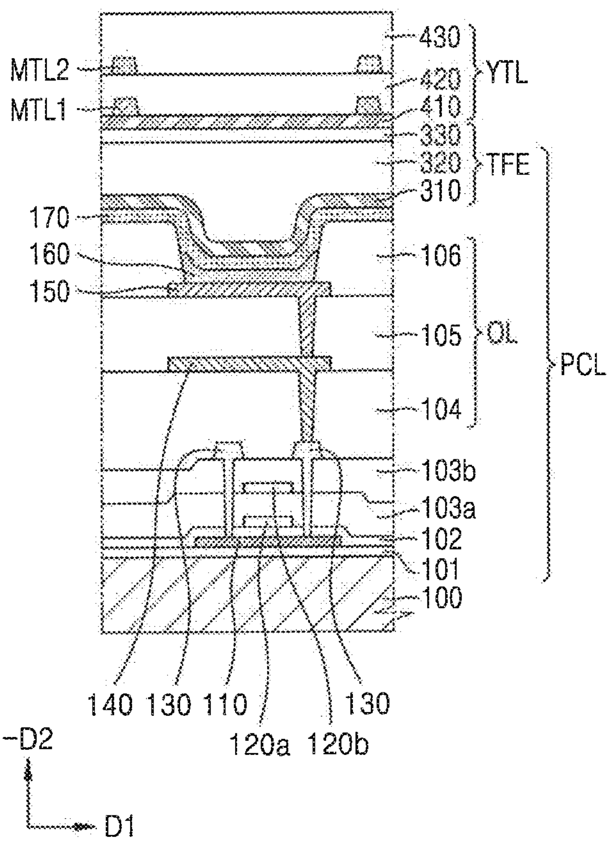
FIG. 8 is a cross-sectional view schematically showing the periphery of one pixel of the display apparatus of FIG. 6 according to an embodiment.

FIG. 8 is a cross-sectional view schematically showing the periphery of one pixel of the display apparatus of FIG. 6. For reference, a description of FIG. 8 that is the same as or overlaps the above description may be omitted.

As described above, the substrate 100 may include areas corresponding to the display area DA and the peripheral area PA outside the display area DA. The substrate 100 may include various flexible or bendable materials. For example, the substrate 100 may include glass, metal, or polymer resin. In addition, the substrate 100 may include polymer resin, such as polyethersulfone, polyacrylate, polyetherimide, polyethylene naphthalate, polyethylene terephthalate, polyphenylene sulfide, polyarylate, polyimide, polycarbonate, or cellulose acetate propionate. The substrate 100 may be variously modified, for example, to have a multi-layer structure including a plurality (e.g., two) layers and a barrier layer between the plurality of layers. Each of the plurality of layers may include the above polymer resin and the barrier layer including an inorganic material (e.g., silicon oxide, silicon nitride, silicon oxynitride, etc.).

A buffer layer 101 may be on the substrate 100. The buffer layer 101 may serve as a barrier layer and/or a blocking layer for preventing diffusion of impurity ions, preventing penetration of moisture or external air, and planarizing a surface. The buffer layer 101 may, for example, include silicon oxide, silicon nitride, or silicon oxynitride. In addition, the buffer layer 101 may adjust the rate at which heat is provided during a crystallization process for forming a semiconductor layer 110, thereby uniformly crystallizing the semiconductor layer 110.

The semiconductor layer 110 may be on the buffer layer 101. The semiconductor layer 110 may be formed of polysilicon and may include a channel region not doped with impurities and a source region and a drain region on respective sides of the channel region and formed by doping with impurities. In this regard, impurities vary depending on types of TFTs and may be N-type impurities or P-type impurities.

A gate insulating layer 102 may be on the semiconductor layer 110. The gate insulating layer 102 may be an element for providing insulation between the semiconductor layer 110 and a first gate layer 120*a*. The gate insulating layer 102 may include an inorganic material (e.g., silicon oxide, silicon nitride and/or silicon oxynitride), and may be disposed between the semiconductor layer 110 and the first gate layer 120*a*. In addition, the gate insulating layer 102 may have a formation corresponding to the entire surface of the substrate 100 and may have a structure in which contact holes are formed in previously set portions. Such an insulating layer including an inorganic material may be formed, for example, through chemical vapor deposition (CVD) or atomic layer deposition (ALD). The same applies to embodiments described below and modifications thereof.

The first gate layer 120*a* may be on the gate insulating layer 102. The first gate layer 120*a* may be arranged at a position vertically overlapping the semiconductor layer 110 and may include at least one metal from among molybdenum (Mo), aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), titanium (Ti), tungsten (W), and copper (Cu).

A first interlayer insulating layer 103*a* may be positioned over the first gate layer 120*a*. The first interlayer insulating layer 103*a* may cover the first gate layer 120*a*. The first interlayer insulating layer 103*a* may be formed of an inorganic material. For example, the first interlayer insulating layer 103*a* may be metal oxide or metal nitride, and more specifically, the inorganic material may include silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZrO_2$). In some embodiments, the first interlayer insulating layer 103_a_ may have a dual structure of $SiO_x/SiN_y$ or $SiN_x/SiO_y$.

A second gate layer 120_b_ may be on the first interlayer insulating layer 103_a_. The second gate layer 120_b_ may be arranged at a position vertically overlapping the first gate layer 120_a_ and may include at least one metal from among molybdenum (Mo), aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), titanium (Ti), tungsten (W), and copper (Cu).

The second gate layer 120_b_ may form the storage capacitor Cst described above with reference to FIG. 7 together with the first gate layer 120_a_. For example, the first gate layer 120_a_ may be one electrode of the storage capacitor Cst, and the second gate layer 120_b_ may be the other electrode of the storage capacitor Cst. When viewed in a direction perpendicular to the substrate 100, the area of the second gate layer 120_b_ may be greater than the area of the first gate layer 120_a_. Alternatively, when viewed in a direction perpendicular to the substrate 100, the second gate layer 120_b_ may cover the first gate layer 120_a_.

A second interlayer insulating layer 103_b_ may be positioned over the second gate layer 120_b_. The second interlayer insulating layer 103_b_ may cover the second gate layer 120_b_. The second interlayer insulating layer 103_b_ may be formed of an inorganic material. For example, the second interlayer insulating layer 103_b_ may be metal oxide or metal nitride, and more specifically, the inorganic material may include silicon oxide ($SiO_2$), silicon nitride (SiNx), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZrO_2$). In some embodiments, the second interlayer insulating layer 103_b_ may have a dual structure of $SiO_x/SiN_y$ or $SiN_x/SiO_y$.

A first conductive layer 130 may be on and penetrate through the second interlayer insulating layer 103_b_. The first conductive layer 130 may serve as an electrode connected to the source/drain region of the semiconductor layer 110 through a through hole in the second interlayer insulating layer 103_b_. The first conductive layer 130 may include one or more metals selected from among aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), and copper (Cu). For example, the first conductive layer 130 may include a Ti layer, an Al layer and/or a Cu layer.

A first organic insulating layer 104 may be positioned over the first conductive layer 130. The first organic insulating layer 104 may be an organic insulating layer that has a substantially flat top surface while covering the top of the first conductive layer 130 and thus serves as a planarization layer. The first organic insulating layer 104 may include an organic material such as, for example, acryl, benzocyclobutene (BCB), or hexamethyldisiloxane (HMDSO). The first organic insulating layer 104 may be variously modified, for example, to have a single-layer or multi-layer structure.

A second conductive layer 140 may be on the first organic insulating layer 104. The second conductive layer 140 may serve as an electrode connected to the source/drain region of the semiconductor layer 110 through a through hole in the first organic insulating layer 104. The second conductive layer 140 may include one or more metals selected from among aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), and copper (Cu). For example, the second conductive layer 140 may include a Ti layer, an Al layer and/or a Cu layer.

A second organic insulating layer 105 may be positioned over the second conductive layer 140. The second organic insulating layer 105 may be an organic insulating layer that has a substantially flat top surface while covering the top surface of the second conductive layer 140 and thus serves as a planarization layer. The second organic insulating layer 105 may include an organic material such as, for example, acryl, BCB, or HMDSO. The second organic insulating layer 105 may be variously modified, for example, to have a single-layer or multi-layer structure.

An organic insulating layer OL may include the first organic insulating layer 104 and the second organic insulating layer 105. In addition, the organic insulating layer OL may be an element further including an additional insulating layer described below.

In addition, an additional conductive layer and an additional insulating layer may be disposed between a conductive layer and a pixel electrode and may be applied to various embodiments. In this regard, the additional conductive layer may include the same material as that of the above-described conductive layer and may have the same layer structure as the above-described conductive layer. The additional insulating layer may include the same material as that of the above-described organic insulating layer and may have the same layer structure as the above-described organic insulating layer.

A pixel electrode 150 may be on the second organic insulating layer 105. The pixel electrode 150 may be connected to the second conductive layer 140 through a contact hole in the second organic insulating layer 105. A display element (or light emission layer) may be on the pixel electrode 150. The organic light-emitting device OLED may be used as the display element. That is, the organic light-emitting device OLED may be interposed, for example, on the pixel electrode 150. The pixel electrode 150 may include a transmissive conductive layer formed of transmissive conductive oxide, such as ITO, $In_2O_3$, or IZO, and a reflective layer formed of metal, such as Al or Ag. For example, the pixel electrode 150 may have a three-layer structure of ITO/Ag/ITO.

A pixel-defining layer 106 may be on the second organic insulating layer 105 and may be disposed thereon to cover edges of the pixel electrode 150. For example, the pixel-defining layer 106 may cover edges of the pixel electrode 150. The pixel-defining layer 106 may have an opening area corresponding to the pixel PX, and the opening area may be formed to expose at least a central portion of the pixel electrode 150. The pixel-defining layer 106 may include an organic material such as, for example, polyimide or HMDSO. In addition, a spacer may be disposed on the pixel-defining layer 106.

An intermediate layer 160 and an opposite electrode 170 may be positioned in the opening area of the pixel-defining layer 106. The intermediate layer 160 (e.g., a light emitting layer) may include a low-molecular weight material or a polymer material, and when the intermediate layer 160 includes a low-molecular weight material, the intermediate layer 160 may include a hole injection layer, a hole transport layer, an emission layer, an electron transport layer and/or an electron injection layer. When the intermediate layer 160 includes a polymer material, the intermediate layer 160 may mostly have a structure including a hole transport layer and an emission layer.

The opposite electrode 170 may include a transmissive conductive layer formed of transmissive conductive oxide, such as ITO, $In_2O_3$, or IZO. The pixel electrode 150 is used as an anode, and the opposite electrode 170 is used as a cathode. In some embodiments, polarities of the electrodes may be reversed.

A structure of the intermediate layer 160 is not limited to the above description, and the intermediate layer 160 may have various structures. For example, at least one of the layers constituting the intermediate layer 160 may be formed as a single body, like the opposite electrode 170. In another embodiment, the intermediate layer 160 may include a layer patterned to correspond to each of a plurality of pixel electrodes 150.

The opposite electrode 170 may be arranged in the display area DA and may be disposed over the entire display area DA. For example, the opposite electrode 170 may be formed as a single body to cover a plurality of pixels. The opposite electrode 170 may be in electrical contact with a common power supply line arranged in the peripheral area PA. In an embodiment, the opposite electrode 170 may extend to a blocking wall. A thin-film encapsulation layer TFE may cover the entire display area DA and may extend toward the peripheral area PA to cover at least a portion of the peripheral area PA.

The thin-film encapsulation layer TFE may extend outside of (e.g., above) the common power supply line. In one embodiment, the thin-film encapsulation layer TFE may include a first inorganic encapsulation layer 310, a second inorganic encapsulation layer 330, and an organic encapsulation layer 320 disposed therebetween. The first inorganic encapsulation layer 310 and the second inorganic encapsulation layer 330 may include one or more inorganic materials among aluminum oxide, titanium oxide, tantalum oxide, hafnium oxide, zinc oxide, silicon oxide, silicon nitride, and silicon oxynitride.

The first inorganic encapsulation layer 310 and the second inorganic encapsulation layer 330 may have a single-layer or multi-layer structure including the above-described material. The first inorganic encapsulation layer 310 and the second inorganic encapsulation layer 330 may include the same material as each other or may include different materials from each other. In one embodiment, thicknesses of the first inorganic encapsulation layer 310 and the second inorganic encapsulation layer 330 may be different from each other. For example, the first inorganic encapsulation layer 310 may be thicker than the second inorganic encapsulation layer 330. Alternatively, the second inorganic encapsulation layer 330 may be thicker than the first inorganic encapsulation layer 310, or thicknesses of the first inorganic encapsulation layer 310 and the second inorganic encapsulation layer 330 may be the same as each other.

The organic encapsulation layer 320 may include a monomer-based material or a polymer-based material. Examples of the polymer-based material may include acryl-based resin, epoxy-based resin, polyimide, and polyethylene. In an embodiment, the organic encapsulation layer 320 may include acrylate.

The touch sensing layer YTL may be disposed on the thin-film encapsulation layer TFE or the second inorganic encapsulation layer 330. The touch sensing layer YTL may have a multi-layer structure. The touch sensing layer YTL includes a sensing electrode, a sensing trace line connected to the sensing electrode, and at least one insulating layer. The touch sensing layer YTL may sense an external input, for example, in a capacitive or resistive manner. As described above, an operation method of the touch sensing layer YTL is not particularly limited. In some embodiments, the touch sensing layer YTL may sense an external input in an electromagnetic induction manner or a pressure sensing manner.

The touch sensing layer YTL may include a first touch insulating layer 410, the first touch conductive layer MTL1, a second touch insulating layer 420, the second touch conductive layer MTL2, and a third touch insulating layer 430. The first touch insulating layer 410 may be on the thin-film encapsulation layer TFE. The first touch insulating layer 410 may include an inorganic material or an organic material and may have a single-layer or multi-layer structure. The organic material may include at least one material selected from the group including acryl-based resin, methacryl-based resin, polyisoprene, vinyl-based resin, epoxy-based resin, urethane-based resin, cellulose-based resin, and perylene-based resin. The inorganic material may include at least one material selected from the group including silicon nitride ($SiN_X$), aluminum nitride (AlN), zirconium nitride (ZrN), titanium nitride (TiN), hafnium nitride (HfN), tantalum nitride (TaN), silicon oxide ($SiO_X$), aluminum oxide ($Al_2O_3$), titanium oxide ($TiO_2$), tin oxide ($SnO_2$), cerium oxide ($CeO_2$), and silicon oxynitride (SiON).

The first touch insulating layer 410 may prevent damage to the thin-film encapsulation layer TFE and may block an interference signal that may occur when the touch sensing layer YTL is driven.

For example, each of the first touch conductive layer MTL1 and the second touch conductive layer MTL2 may have a single-layer structure or a stacked multi-layer structure. A conductive layer having a single-layer structure may include a metal layer or a transparent conductive layer. The metal layer may include molybdenum (Mo), silver (Ag), titanium (Ti), copper (Cu), aluminum (Al), and alloys thereof. The transparent conductive layer may include transparent conductive oxide, such as indium tin oxide (ITO), indium zinc oxide (IZO), zinc oxide (ZnO), indium tin zinc oxide (ITZO), etc. In addition, the transparent conductive layer may include a conductive polymer such as poly(3,4-ethylenedioxythiophene) (PEDOT), metal nanowires, graphene, etc.

A conductive layer having a multi-layer structure may include multiple metal layers. The multiple metal layers may have, for example, a three-layer structure of titanium/aluminum/titanium (Ti/Al/Ti). The conductive layer having a multi-layer structure may include at least one metal layer and at least one transparent conductive layer.

Each of the first touch conductive layer MTL1 and the second touch conductive layer MTL2 includes a plurality of patterns. The first touch conductive layer MTL1 may be understood as including first conductive patterns, and the second touch conductive layer MTL2 may be understood as including second conductive patterns. The first conductive patterns and the second conductive patterns may constitute the sensing electrode.

The first touch conductive layer MTL1 and the second touch conductive layer MTL2 may be electrically connected to each other through a contact hole. In an embodiment, the first touch conductive layer MTL1 and the second touch conductive layer MTL2 may have a mesh structure to allow light emitted from a light-emitting material below to pass through. In this regard, the first touch conductive layer MTL1 and the second touch conductive layer MTL2 may not overlap a pattern on which the light-emitting material is printed in a plan view.

The second touch insulating layer 420 may include an organic material. The organic material may include at least one material selected from the group including acryl-based resin, methacryl-based resin, polyisoprene, vinyl-based resin, epoxy-based resin, urethane-based resin, cellulose-based resin, and perylene-based resin. The second touch insulating layer 420 may further include an inorganic material. The inorganic material may include at least one material selected from the group including silicon nitride ($SiN_X$), aluminum nitride (AlN), zirconium nitride (ZrN), titanium nitride (TiN), hafnium nitride (HfN), tantalum nitride (TaN), silicon oxide ($SiO_X$), aluminum oxide ($Al_2O_3$), titanium oxide ($TiO_2$), tin oxide ($SnO_2$), cerium oxide ($CeO_2$), and silicon oxynitride (SiON).

The third touch insulating layer 430 may be disposed over the second touch conductive layer MTL2. The third touch insulating layer 430 may have a single-layer or multi-layer structure. The third touch insulating layer 430 may include an organic material, an inorganic material, or a composite material. The inorganic material may include at least one material selected from the group including silicon nitride ($SiN_X$), aluminum nitride (AlN), zirconium nitride (ZrN), titanium nitride (TiN), hafnium nitride (HfN), tantalum nitride (TaN), silicon oxide ($SiO_X$), aluminum oxide ($Al_2O_3$), titanium oxide ($TiO_2$), tin oxide ($SnO_2$), cerium oxide ($CeO_2$), and silicon oxynitride (SiON). The organic material may include at least one material selected from the group including acryl-based resin, methacryl-based resin, polyisoprene, vinyl-based resin, epoxy-based resin, urethane-based resin, cellulose-based resin, and perylene-based resin.

One or more additional layers may be included. For example, a color filter layer may be included for improving outcoupling efficiency of the organic light-emitting device OLED and may be disposed on the touch sensing layer YTL.

Figure 9:
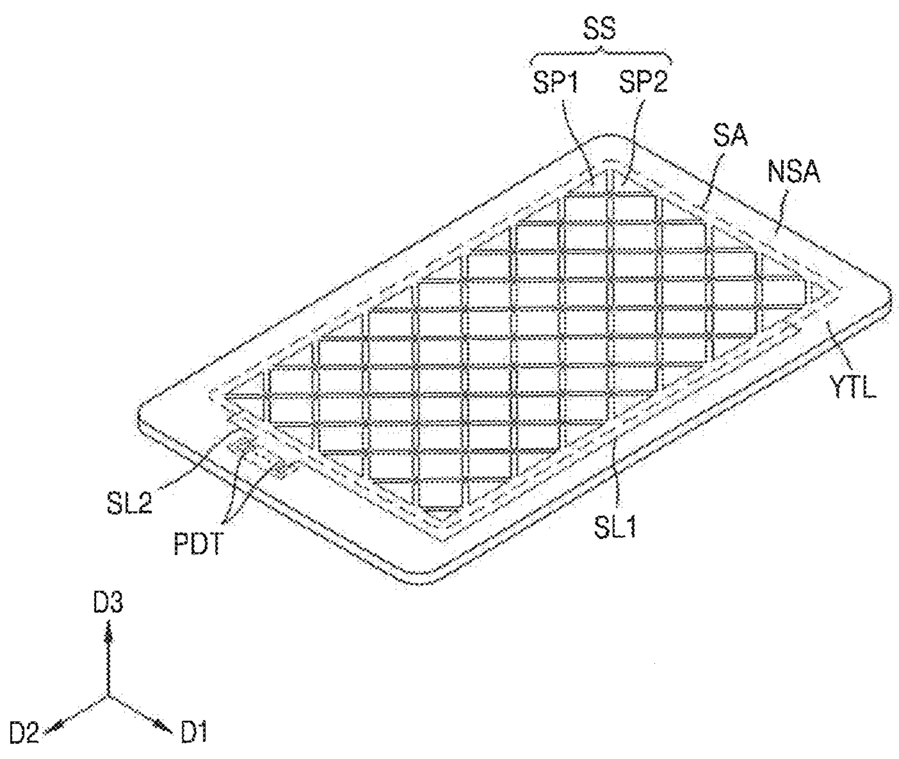
FIG. 9 is a perspective view separately showing a touch sensing layer of the display panel of FIG. 6 according to an embodiment.

FIG. 9 is a perspective view separately showing the touch sensing layer YTL of the display panel 10 of FIG. 6 according to an embodiment. For reference, a description of FIG. 9 that is the same as or overlaps the above description may be omitted.

The touch sensing layer YTL is disposed on the thin-film encapsulation layer TFE. The touch sensing layer YTL may sense an external input (e.g., a user's touch) and obtain information regarding a position or intensity of the external input. The touch sensing layer YTL may include a plurality of sensing lines SL1 and SL2 and a plurality of sensing pads PDT.

The touch sensing layer YTL may include a sensing area SA and a non-sensing area NSA. The sensing area SA may be an area capable of sensing an external input. The sensing area SA may overlap the display area DA. In the present embodiment, an active area may be an area including the sensing area SA and the display area DA.

The non-sensing area NSA is adjacent to the sensing area SA. The non-sensing area NSA may at least partially or entirely surround the edge of the sensing area SA. The non-sensing area NSA entirely surrounding the sensing area SA is only shown as an example. In one embodiment, the non-sensing area NSA may be adjacent to only a portion of the edge of the sensing area SA or may be omitted.

A sensing electrode SS is arranged in the sensing area SA. The sensing electrode SS may include a first sensing electrode SP1 and a second sensing electrode SP2 that receive different electrical signals from each other. The sensing electrode SS may obtain information regarding an external input through a change in capacitance between the first sensing electrode SP1 and the second sensing electrode SP2.

The first sensing electrode SP1 extends in the first direction D1. The first sensing electrode SP1 may include a plurality of first sensing electrodes SP1, and the plurality of first sensing electrodes SP1 may be apart from each other in the second direction D2. The second sensing electrode SP2 extends in the second direction D2. The second sensing electrode SP2 may include a plurality of second sensing electrodes SP2, and the plurality of second sensing electrodes SP2 may be apart from each other in the first direction D1.

The sensing lines SL1 and SL2 and the sensing pads PDT are arranged in the non-sensing area NSA. The sensing pads PDT are connected to the sensing lines SL1 and SL2, respectively. The sensing lines SL1 and SL2 include a first sensing line SL1 and a second sensing line SL2. The first sensing line SL1 is configured to transmit an electrical signal provided, for example, from a host through the sensing pad PDT to the first sensing electrode SP1 by connecting the first sensing electrode SP1 and the sensing pad PDT to each other. The second sensing line SL2 is configured to transmit an electrical signal provided from the outside through the sensing pad PDT to the second sensing electrode SP2, by connecting the second sensing electrode SP2 and the sensing pad PDT to each other. The sensing pads PDT in the non-sensing area NSA may be electrically connected to other pads of the display panel 10.

Additionally, examples of the display panel 10 are as follows.

Referring again to FIGS. 1 and 2, in an embodiment the display panel 10 may be the display panel 10 controlled by the control unit 20 of the vehicle 1. More specifically, the control unit 20 of the vehicle 1 may control the driving driver 11*b* of the display panel 10.

The display panel 10 may include a substrate including a display area and a peripheral area. The display panel 10 may include the plurality of touch sensors 11*a* and the driving driver 11*b* on the substrate. More specifically, the plurality of touch sensors 11*a* may be arranged in the display area of the substrate. The driving driver 11*b* configured to drive the touch sensors 11*a* may be arranged in the peripheral area of the substrate.

The driving driver 11*b* may be controlled by the control unit 20 of the vehicle 1. The driving driver 11*b* may be controlled by the control unit 20 of the vehicle 1 to be driven in a first mode of being driven with a first drive voltage or a second mode of being driven with a second drive voltage, wherein the second drive voltage is lower than the first drive voltage.

For example, in the first mode, the driving driver 11*b* may generate a first sensing signal for sensing a change in self-capacitance included in the plurality of touch sensors 11*a*. In addition, in the first mode, the driving driver 11*b* may generate a second sensing signal for sensing a change in mutual capacitance (and thus a corresponding touch location) included in the plurality of touch sensors 11*a*.

For example, in the second mode, the driving driver 11*b* may generate a first sensing signal for sensing a change in self-capacitance included in the plurality of touch sensors 11*a* and may not generate a second sensing signal for sensing a change in mutual capacitance included in the plurality of touch sensors 11*a*.

For example, when the ignition of the vehicle 1 is turned on, the driving driver 11*b* may be driven in the first mode.

For example, when a state of the vehicle 1 is switched to an ISG entry state after the ignition of the vehicle 1 is turned on, the user input sensor 11 may be driven in the second mode.

For example, when the state of the vehicle 1 deviates from the ISG entry state, or a user input is sensed by a touch sensor, the user input sensor 11 may be driven in the first mode.

For example, when the driving driver 11*b* is in the first mode, the touch sensors 11*a* may sense whether there is a user's touch input or not and the user's touch position.

For example, when the driving driver 11*b* is in the second mode, the touch sensors 11*a* may sense whether there is a user's touch input or not and may not sense the user's touch position.

According to one or more of the above embodiments, a display apparatus for efficient power consumption and a vehicle including a display panel may be implemented. However, one or more embodiments are not limited by such an effect.

While one or more embodiments have been described with reference to the figures, it will be understood by those of ordinary skill in the art that various changes in form and details may be made therein without departing from the spirit and scope as defined by the following claims. Unless otherwise described, descriptions of features or aspects within each embodiment should typically be considered as available for other similar features or aspects in other embodiments. Accordingly, as it would be apparent to those of ordinary skill in the art, features or elements described in connection with certain embodiments may be combined with features or elements described in connection with other embodiments. Therefore, the above descriptions should not be construed as being limited to certain embodiments disclosed herein, and it should be understood that combination with other example embodiments or application to other example embodiments is intended. Accordingly, the technical scope of the disclosure for which protection is sought should be defined by the appended claims. The embodiments may be combined to form additional embodiments.

What is claimed is:

1. A vehicle comprising:

a display panel including a user input sensor; and a controller configured to sense a state of the vehicle and control the display panel based on the state of the vehicle, wherein the user input sensor is controlled by the controller to be driven in a first mode by applying a first drive voltage to the user input sensor and outputting sensing information at a first report rate, and a second mode by applying a second drive voltage to the user input sensor and outputting the sensing information at a second report rate, in response to the sensed state of the vehicle, wherein in the first mode, the user input sensor is configured to generate a first sensing signal to sense a change in self-capacitance in the user input sensor and to generate a second sensing signal to sense a change in mutual capacitance in the user input sensor, wherein in the second mode, the user input sensor is configured to generate a first sensing signal to sense a change in self-capacitance in the user input sensor and to not generate a second sensing signal to sense a change in mutual capacitance comprised in the user input sensor, wherein the second drive voltage is lower than the first drive voltage, and the second drive voltage is configured to operate the user input sensor in a self-capacitance sensing mode, and wherein the second report rate is higher than the first report rate.

2. The vehicle of claim 1, wherein, when an ignition of the vehicle is turned on, the user input sensor is configured to be driven in the first mode.

3. The vehicle of claim 2, wherein, when the state of the vehicle is switched to an Idle Stop & Go (ISG) entry state after the ignition of the vehicle is turned on, the user input sensor is configured to be driven in the second mode.

4. The vehicle of claim 3, wherein the user input sensor is configured to be driven in the first mode when the state of the vehicle deviates from the ISG entry state or a user input is sensed by the user input sensor.

5. The vehicle of claim 2, wherein the user input sensor is configured to be driven in the second mode when the state of the vehicle satisfies a previously determined condition after the vehicle's ignition is turned on.

6. The vehicle of claim 2, wherein the user input sensor is configured to be driven in the second mode when the vehicle runs at a previously set speed or higher after the ignition of the vehicle is turned on.

7. The vehicle of claim 2, wherein the user input sensor is configured to be driven in the second mode when a door of the vehicle is opened after the vehicle's ignition is turned on.

8. The vehicle of claim 2, wherein the user input sensor is configured to be driven in the second mode when a user input is not sensed by the user input sensor for a previously set time after the ignition of the vehicle is turned on.

9. The vehicle of claim 1, wherein, in the first mode, the user input sensor is configured to sense whether there is a user's touch input or not by using the first sensing signal and a user's touch position by using the second sensing signal.

10. The vehicle of claim 1, wherein, in the second mode, the user input sensor is configured to sense whether there is a user's touch input or not by using the first sensing signal and does not sense a user's touch position.

11. The vehicle of claim 1, wherein power consumption per unit time of the user input sensor in the first mode is greater than power consumption per unit time of the user input sensor in the second mode.

12. A display apparatus comprising:

a display panel configured to be controlled by a controller of a vehicle, the display apparatus comprising:

a substrate comprising a display area and a peripheral area;

a plurality of touch sensors arranged in the display area of the substrate; and a driving driver arranged in the peripheral area of the substrate and configured to drive the plurality of touch sensors, wherein the driving driver is configured to be controlled by the controller to be driven in a first mode by applying a first drive voltage to the plurality of touch sensors and outputting sensing information at a first report rate, and a second mode by applying a second drive voltage to the plurality of touch sensors and outputting the sensing information at a second report rate, in response to a sensed state of the vehicle, wherein the second report rate is higher than the first report rate, wherein in the first mode, the plurality of touch sensors is configured to generate a first sensing signal to sense a change in self-capacitance in the plurality of touch sensors and to generate a second sensing signal to sense a change in mutual capacitance in the plurality of touch sensors, wherein in the second mode, the plurality of touch sensors is configured to generate a first sensing signal to sense a change in self-capacitance in the plurality of touch sensors and to not generate a second sensing signal to sense a change in mutual capacitance comprised in the plurality of touch sensors, and wherein the second drive voltage is lower than the first drive voltage, and the second driving voltage is configured to operate the plurality of touch sensors in a self-capacitance sensing mode.

13. The display apparatus of claim 12, wherein the driving driver is configured to be driven in the first mode when an ignition of the vehicle is turned on.

14. The display apparatus of claim 13, wherein the driving driver is configured to be driven in the second mode when a state of the vehicle is switched to at least one previously set condition after the ignition of the vehicle is turned on, the at least one previously set condition comprises a case where the vehicle runs at a previously set speed or higher, a case where a driver's door of the vehicle is opened, a case where a user input is not sensed by the touch sensors for a previously set time, or a case where the vehicle enters an Idle Stop & Go (ISG) mode.

15. The display apparatus of claim 14, wherein the driving driver is configured to be driven in the first mode when the state of the vehicle deviates from the at least one previously set condition or a user input is sensed by the plurality of touch sensors.

16. The display apparatus of claim 12, wherein:

when the driving driver is in the first mode, the touch sensors are configured to sense whether there is a user's touch input or not by using the first sensing signal and a user's touch position by using the second sensing signal, and when the driving driver is in the second mode, the touch sensors sense whether there is a user's touch input or not by using the first sensing signal and do not sense the user's touch position.

17. A method for controlling a display apparatus, the method comprising:

driving a touch sensor in a first mode by applying a first drive voltage to the touch sensor and outputting sensing information at a first report rate;

determining whether at least one previously set condition of a vehicle is satisfied;

driving the touch sensor in a second mode by applying a second drive voltage to the touch sensor and outputting the sensing information at a second report rate when the at least one previously set condition is satisfied, wherein the second drive voltage is configured to operate the touch sensor in a self-capacitance sensing mode, wherein the second report rate is higher than the first report rate, and wherein:

in the first mode, the touch sensor is configured to generate generates a first sensing signal to sense a change in self-capacitance and a second sensing signal to sense a change in mutual capacitance, and in the second mode, the touch sensor generates the first sensing signal and not the second sensing signal, wherein power consumption in the first mode is greater than power consumption in the second mode.

18. The method of claim 17, wherein:

the first sensing signal is generated based on a touch by a user, and the second sensing signal is generated based on a position of the touch.

19. The method of claim 18, wherein a number of bursts in the second mode is less than a number of bursts in the first mode.

20. The method of claim 17, wherein the at least one previously set condition is one of:

a case where the vehicle runs at a previously set speed or higher, a case where a door of the vehicle is opened, a case where a user input is not sensed by touch sensor for a previously set time, or a case where the vehicle enters an idle stop and go (ISG) mode.

* * * * *